(12) United States Patent
Zee

(10) Patent No.: US 7,174,544 B2
(45) Date of Patent: Feb. 6, 2007

(54) JAVA COMPILE-ON-DEMAND SERVICE SYSTEM FOR ACCELERATING PROCESSING SPEED OF JAVA PROGRAM IN DATA PROCESSING SYSTEM AND METHOD THEREOF

(75) Inventor: Dae Hoon Zee, Seoul (KR)

(73) Assignees: Interwise Co., Ltd., Seoul (KR); Institute of Information Technology Assessment, Daejeon-si (KR)

( * ) Notice: Subject to any disclaimer, the term of this patent is extended or adjusted under 35 U.S.C. 154(b) by 594 days.

(21) Appl. No.: 10/096,934

(22) Filed: Mar. 14, 2002

(65) Prior Publication Data

US 2003/0005425 A1 Jan. 2, 2003

(30) Foreign Application Priority Data

Jun. 27, 2001 (KR) .............................. 2001-37191

(51) Int. Cl.
*G06F 9/45* (2006.01)
(52) U.S. Cl. ...................... 717/148; 717/136; 717/139; 717/140; 717/178
(58) Field of Classification Search ........ 709/203–224; 707/3; 717/143
See application file for complete search history.

(56) References Cited

U.S. PATENT DOCUMENTS 5,778,231 A * 7/1998 van Hoff et al. ............ 717/143

| 6,363,421 | B2 * | 3/2002 | Barker et al. | ................ 709/223 |
| 6,587,878 | B1 * | 7/2003 | Merriam | ...................... 709/224 |
| 6,604,135 | B1 * | 8/2003 | Rogers et al. | .............. 709/217 |
| 6,665,659 | B1 * | 12/2003 | Logan | ............................ 707/3 |
| 2002/0016820 | A1 * | 2/2002 | Du Val et al. | .............. 709/203 |
| 2003/0195960 | A1 * | 10/2003 | Merriam | ...................... 709/224 |

* cited by examiner

*Primary Examiner*—Kakali Chaki
*Assistant Examiner*—Mark P. Francis
(74) *Attorney, Agent, or Firm*—Rosenberg, Klein & Lee

(57) ABSTRACT

A JAVA program language compile-on-demand service system and method for accelerating a processing speed of a JAVA program in a data processing system having a relatively low performance is provided. The JAVA COD service system compiles a JAVA class file to be executed in a data processing system into a pattern which can be executed more speedily on the data processing system, and then transmits the compiled result, upon a request of the data processing system connected via a network in order to execute the JAVA program at a relatively faster speed. The system includes JAVA program providing servers, data processing systems, and a compile-on-demand server for receiving a service request, downloading a requested JAVA class file, compiling the downloaded JAVA class file, and transmitting the compiled result.

8 Claims, 3 Drawing Sheets

US 7,174,544 B2

JAVA COMPILE-ON-DEMAND SERVICE SYSTEM FOR ACCELERATING PROCESSING SPEED OF JAVA PROGRAM IN DATA PROCESSING SYSTEM AND METHOD THEREOF

TECHNICAL FIELD

The present invention relates to a JAVA™ program language compile-on-demand (COD) service system and method for accelerating the processing speed of a program written in the JAVA program language in a data processing system (JAVA is a trademark of Sun Microsystems, Inc.), for example, an information processing terminal such as a personal digital assistant (PDA) or mobile telephone terminal, and more particularly, to a JAVA program language compile-on-demand service system and method for compiling a JAVA program class file to be executed in a data processing system into a pattern which can be executed more speedily on the data processing system, and then transmitting the compiled result to the data processing system, upon a request of the data processing system connected via a network in order to execute a program written in the JAVA program language at a relatively faster speed in a system having a relatively low performance, to thereby accelerate the processing speed of a JAVA program in the data processing system.

BACKGROUND ART

In general, the JAVA program language is being widely used in developing various applications such as a in the network related field, on the basis of a neutral performance and an excellent stability of a JAVA platform since it was issued in 1995. The JAVA platform has been recently mounted in a mobile telephone terminal, and thus used in a game and an electronic commerce service which use a wireless Internet.

There is a JAVA programming language which is used for a programming work such as FORTRAN, COBOL, PASCAL or C, a JAVA platform which points out a JAVA API (Application Programming Interface) necessary for a programming work by use of a JAVA program language, and a JAVA virtual machine (JVM) for executing a JAVA program. The JAVA program language is an object oriented computer program language that is designed to run with any operating system using an interpreter. The JAVA platform is a JAVA program execution system for a data processing system, which consists of a JAVA virtual machine (byte code interpreter) a standard JAVA class files and native libraries.

As illustrated in FIG. 1, a structure of the JAVA platform can be configured to have a system operating system (OS) 1 for taking in charge of controlling a variety of hardware in a JAVA platform mounted system, a JAVA virtual machine (JVM) 2 and a JAVA API 2a which operate in the system OS 1, and a JAVA program 3 which operates on the JVM 2 and the JAVA API 2a.

A general JAVA program source file is configured to have a text file of an extension of *.java. A JAVA compiler reads a source code from a source file, compiles each function in the source into a virtual machine language called a bytecode, and then produces an execution module having an extension of *.class by each class included in the source.

The execution module is generally called a class file. For reference, a CPU machine language for a data processing system called an information processing terminal in which a program is actually executed is called a native code. Also, an execution module which can be executed in a system OS mounted in the data processing system is called a native component. In the case of a general IBM personal computer (PC) which uses a WINDOWS OS (IBM is a trademark of IBM Corporation and WINDOWS is a trademark of Microsoft Corporation), files having extensions of *.exe, *.dll and *.ocx correspond to the native components. The native components are binary files, which means all files except text file types, for example, *.txt."

When a class file is produced, information of a name and a function factor of each function included in the class file, information of a name and a type of each variable, and information of a function and a variable of an external class file referenced in each function, are all stored. accordingly, even in the case that a JAVA class file is downloaded via a network, a class file can be easily used without having particular external information.

As illustrated in FIG. 2, a JAVA virtual machine 5 corresponding to the JVM 2 of FIG. 2 includes a class loader 5a, a bytecode interpreter 5b, and a native library 5c.

The class loader 5a reads a JAVA class file from a network or file system, disposes the read JAVA class file on a memory appropriately according to internal information included in the class file, and then plays a role of initializing an internal state.

Whenever each function is called, the bytecode interpreter 5b is a system which analyzes a JAVA bytecode included in the function and executes a native code having the same effect as the JAVA bytecode.

A bytecode is not made in order to be used for a particular CPU as in a general machine language, but is designed to be executed in a virtual CPU made of software. The bytecode interpreter 5b plays the role of the virtual CPU. Therefore, the JAVA program is an interpreter-based program.

The native library 5c indicates a system library in which standard functions related to a control of hardware necessary for executing a JAVA program are implemented based on a system OS and a hardware environment of a data processing system such as an information processing terminal in which a JAVA platform virtual machine is mounted. The native library 5c includes a network library 5d for administrating a network and a file system, screen control and input control libraries 5e and 5f for controlling a screen and an input for matching a standardized function, and a memory administration library 5g for administrating a memory according to execution of programs.

The hardware control functions included in the native library include only minimized essential standard functions so as to be easily implemented under a variety of system OS environments. The bytecode interpreter controls hardware through only the native library. Accordingly, a JAVA platform virtual machine can be easily implanted even in a variety of system OS and hardware environments. As a result, it is possible to execute a JAVA program in the same manner even in a variety of data processing systems which use respectively different CPUs and OSs.

However, in the case that a JAVA program is executed in a virtual machine having the above-described configuration, a program processing speed becomes slow 20 to 100 times through an interpreting process of a bytecode interpreter, in comparison with the case that a native code programmed in a language such as C or Pascal is executed in order to obtain the same effect.

In order to solve the above speed retardation problem, a computer higher than a general PC class chiefly uses a JIT (Just In Time Compile) technology. A JIT compile indicates a system which compiles a JAVA bytecode into a machine language, that is, a native code for matching a CPU in the system, immediately before or after any JAVA function is executed, stores the compiled native code for each function, and then directly executes the compiled native code without passing through an interpreting process whenever a corresponding function is called, to thereby greatly accelerate a processing speed. A program taking charge of the above functions is called a JIT compiler.

Thus, a processing speed of the JIT compile technology becomes slow 3 to 10 times in comparison with the case that a native code programmed in a language such as C or Pascal is executed in order to obtain the same effect as that of the JAVA program. As a result, the processing speed of the JIT compile technology become fast 5 to 10 times as that processed through an existing interpreting process.

However, the bytecode interpreter can be implemented relatively easily by using a high level language such as C or Pascal, but the JIT compiler should directly compile such a high level language into a machine language for matching each CPU. As a result, it is very difficult to implement the JIT compiler. A capacity of memory necessary for storing and executing the program of the JIT compiler becomes large. Thus, in the case of devices which use a variety of CPUs as in a mobile telephone terminal, a PDA, and a set-top-box, it is very difficult to use the JIT compiler. In particular, since such a portable information processing terminal uses a CPU of a lower performance than in a general PC, lowering of a processing speed of a JAVA program causes a larger problem.

Meanwhile, although it is not widely used, an AOT (Ahead Of Time) compile technology exists as an alternative method for accelerating a processing speed of a JAVA program. The AOT compile indicates a system which compiles all JAVA class files used in a system into native components which can be executed in a CPU and a system OS in an information processing terminal, in advance, and loads the compiled result in the system.

Programs which read JAVA source files or class files, and then produces native components for matching a particular CPU or compile the read files into other programming languages which can produce native codes, that is, C, C++, and Pascal, are usually called JAVA AOT compilers.

Since the JAVA AOT compiler is executed in a separated system, a JAVA platform virtual machine in an information processing terminal which actually executes a JAVA program does not need a particular bytecode interpreter or JIT compiler. Thus, the JAVA AOT compiler is a technology for accelerating a JAVA program processing speed which can be used even in a compact device having a small capacity of memory. Also, the JAVA AOT compiler has a nearly same processing speed as a C or C++ program which executes the same function.

However, since the above-described AOT compiler system cannot execute JAVA programs other than a JAVA program incorporated at the time of fabricating an information processing terminal, a mobile type information processing terminal which should execute various kinds of JAVA programs under certain circumstances cannot use the AOT compiler.

DISCLOSURE OF THE INVENTION

To solve the above problems, it is an object of the present invention to provide a JAVA program language compile-on-demand service system and method for accelerating the processing speed of a JAVA program in a data processing system, for example, an information processing terminal such as a personal digital assistant (PDA) or a mobile telephone terminal, which enables any JAVA programs on the Internet to be executed at very fast speed in the data processing system which uses a limited capacity of a memory and a CPU having a relatively lower speed.

To accomplish the above object of the present invention, there is provided a JAVA program language compile-on-demand service system for accelerating a processing speed of a JAVA program in a data processing system, the JAVA program language compile-on-demand service system comprising: a plurality of JAVA program providing servers for providing at least one JAVA class file on the Internet; a plurality of data processing systems which can be accessed on the Internet; and at least one compile-on-demand server for receiving a service request from the plurality of data processing systems, downloading a requested JAVA class file from the JAVA program providing server, compiling the downloaded JAVA class file into a pattern which can be executed more quickly in the data processing system, and transmitting the compiled result.

The compile-on-demand server comprises at least one compiler which compiles a JAVA class file made of a JAVA virtual machine language of bytecodes into an execution file, that is, a native component which can directly executed in a CPU mounted in the data processing system without having a bytecode interpreter or JIT compiler.

The compile-on-demand service comprises at least one compiler, a database storing the native component compiled by the compiler, and a compile information table storing a compile name and a compile condition necessary for producing the native component appropriate for the data processing system.

The data processing system comprises a native library in which hardware control functions necessary for executing the native component compiled JAVA program are implemented for matching each system OS and CPU, and a native component loader for transmitting a service request message to the compile-on-demand server, downloading a target matter requested from the compile-on-demand server, that is, a native component, and relocating the downloaded native component in a memory and executing the same.

According to another aspect of the present invention, there is provided a JAVA program language compile-on-demand service method for accelerating a processing speed of a JAVA program in a data processing system, the JAVA program language compile-on-demand service method comprising the steps of: (a) receiving a service request message including information about a location of a JAVA class file to be compiled into a native component and a kind of the data processing system, from the data processing system mounted with a native component loader for relocating a native library and a native component each made of hardware control functions necessary for executing a JAVA program in a memory and executing the same; (b) analyzing the service request message received from the data processing system, downloading a JAVA class file via the Internet, and compiling the downloaded JAVA class file into a native component which can be executed in the data processing system having requested the compiling service; and (c) transmitting the compiled native component to the data processing system and executing the same.

The JAVA program language compile-on-demand service method for accelerating a processing speed of a JAVA program in a data processing system, further comprises the step of storing the native component produced through step (b) together with the service request message, and transmitting the native component to the data processing system if the same service request message is received from another data processing system.

When any JAVA programs on the Internet are executed in a data processing system which uses a limited capacity of a memory and a processor having a relatively low performance, the present invention compiles the JAVA programs into a pattern which can be executed at faster speed, by using a compile-on-demand server connected via a network without incorporating a particular JIT compiler in the data processing system, and executes the same, to thereby accelerate a processing speed of the JAVA program at maximum.

BRIEF DESCRIPTION OF THE DRAWINGS

The above object and other advantages of the present invention will become more apparent by describing the preferred embodiments thereof in more detail with reference to the accompanying drawings in which.

BEST MODE FOR CARRYING OUT THE INVENTION

A preferred embodiment of the present invention will be described below in more detail with reference to the accompanying drawings FIGS. 3 and 4.

Figure 1:
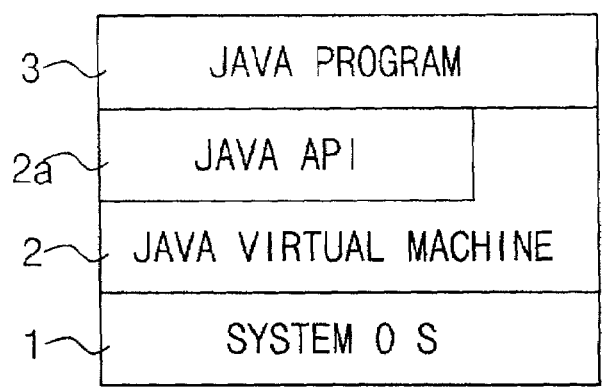
FIG. 1 is an illustration for explaining the JAVA platform.
Figure 2:
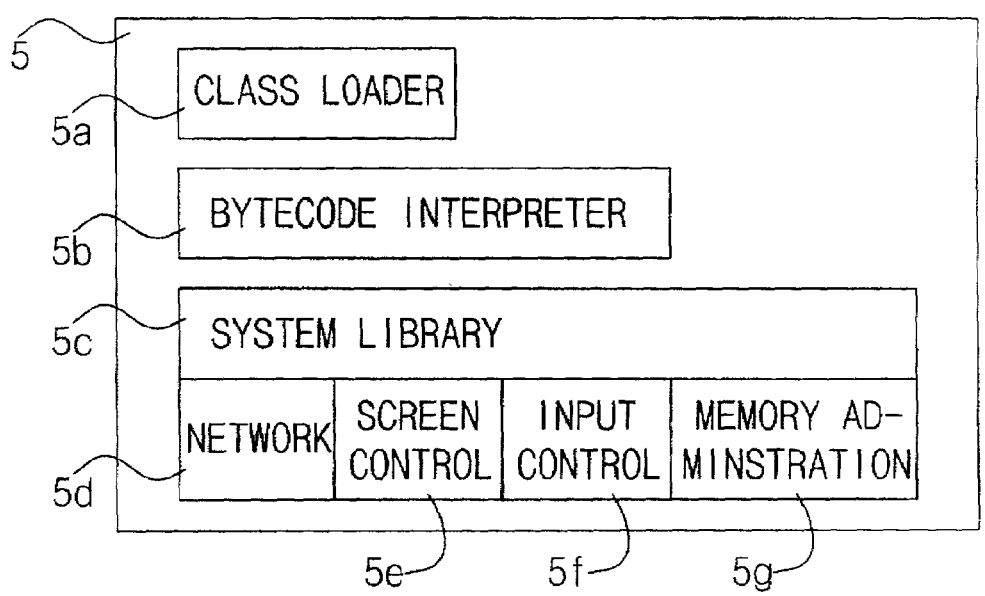
FIG. 2 is an illustration for explaining the structure of a JAVA virtual machine.
Figure 3:
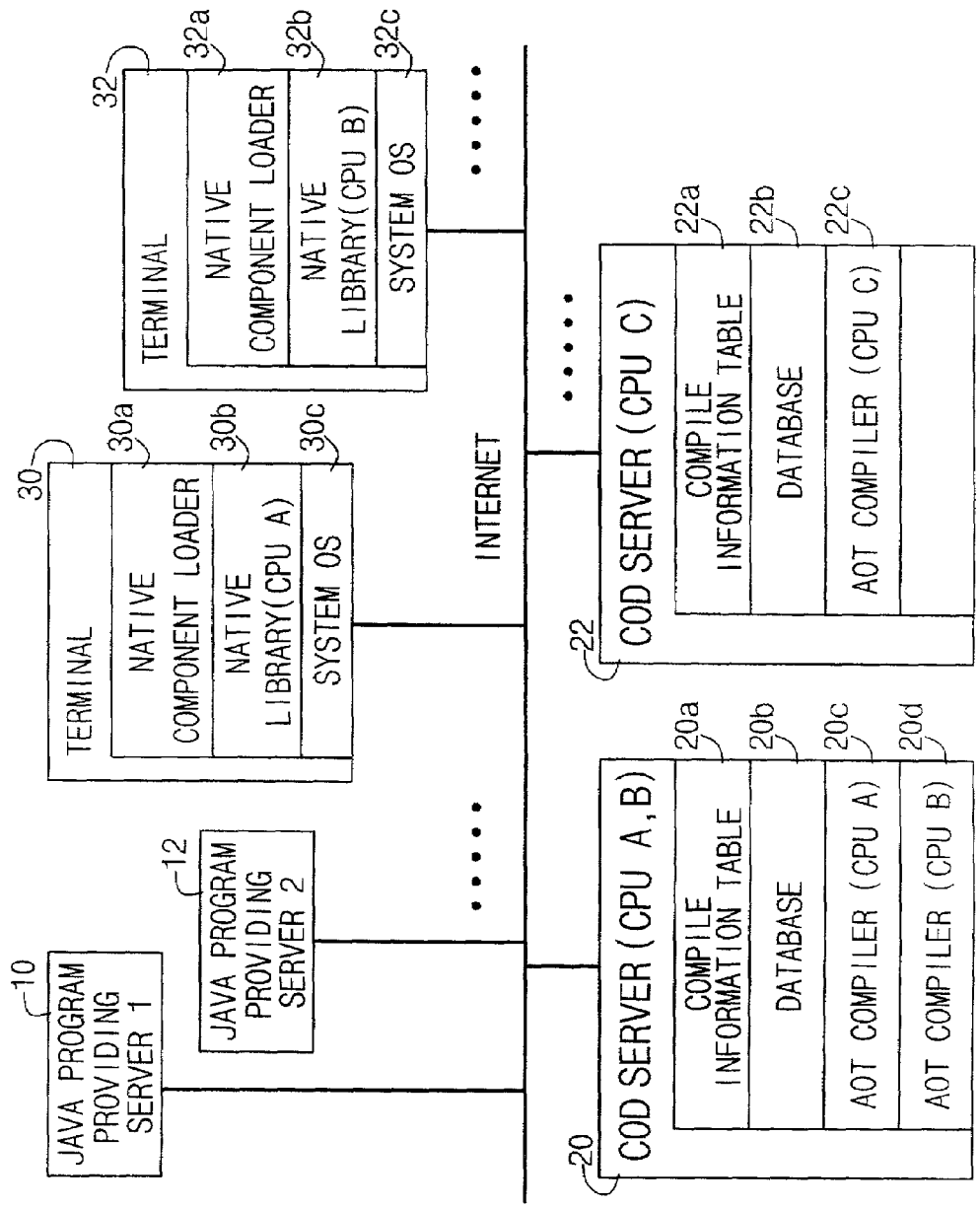
FIG. 3 is a block diagram for explaining a JAVA program language compile-on-demand service system for accelerating a processing speed of a JAVA program in a data processing system such as an information processing terminal called a personal digital assistant (PDA) according to the present invention.

As shown in FIG. 3, a JAVA program language compile-on-demand service system for accelerating a processing speed of a JAVA program in a data processing system, for example, an information processing terminal according to the present invention, includes JAVA program providing servers 10 and 12 which provide at least one JAVA class file via the Internet, data processing systems 30 and 32, such as information processing terminals which can be accessed on the Internet, and compile-on-demand servers 20 and 22 for downloading JAVA class files requested by the data processing systems 30 and 32, from the JAVA program providing servers 10 and 12, compiling the downloaded JAVA class files into native components of patterns which can be executed in the data processing systems, and transmitting the compiled results, respectively.

The compile-on-demand server comprises at least one compiler which compiles a JAVA class file made of a JAVA virtual machine language of bytecodes into an execution file, that is, a native component which can directly executed in a CPU mounted in the data processing system without having a bytecode interpreter or JIT compiler.

The compile-on-demand service comprises at least one compiler, a database storing the native component compiled by the compiler, and a compile information table storing a compile name and a compile condition necessary for producing the native component appropriate for the data processing system.

The data processing system 30 or 32 comprises a system OS 30*c* or 32*c* matching each system, a native library 30*b* or 32*b* taking in charge of hardware control necessary for executing the native component, and a native component loader 30*a* or 32*a*.

The native component loader 30*a* or 32*a* transmits a service request message to the compile-on-demand server 20 or 22, receives a native component from the compile-on-demand server 20 or 22, and relocates the received native component in a memory and executing the same.

The native library 30*b* or 32*b* denotes a system library which embodies functions related with hardware control necessary for executing a JAVA program, and plays the same role of that of the native library mounted on an existing JAVA platform virtual machine. However, the native library need not be necessarily implemented according to a standard, differently from the native library mounted on the existing JAVA platform virtual machine, and also the configuration thereof can be altered according to a use purpose of the terminal.

In general, a function of relocating a native component downloaded via the compile-on-demand server 20 or 22 and executing the same can be replaced by that of a system OS mounted on the data processing system 30 or 32.

That is, in the case that a WINDOWS OS is used, native components having extensions such as *.exe, *.dll and *.ocx as a type of the file downloaded via the compile-on-demand server in the native component loader are relocated on a memory and executed by using an input and output administration function and a memory administration function provided by the system OS without having a particular native component. In most cases, the system OS 30*c* or 32*c* incorporated in the data processing system 30 or 32 provides a function of relocating a particular program on a memory and executing the same. Thus, the description of a method for implementing the native component loader 30*a* or 32*a* will be omitted.

The compile-on-demand server 20 or 22 denotes a service operating program for processing a compile-on-demand service and a computer system having the service operating program therein, which includes a plurality of AOT compilers 20*c*, 20*d* and 22*c*, compile information tables 20*a* and 22*a* in which system information is recorded for each of the plurality of data processing systems 30 and 32, and databases 20*b* and 22*b* storing the results compiled for each of the plurality of data processing systems 30 and 32.

The AOT compiler 20*c*, 20*d* or 22*c* plays a role of compiling a JAVA class file into a native component which can be executed in the data processing systems 30 or 32. In the case that requests from a variety of data processing systems 30 and 32 are to be processed, an AOT compiler should be installed in order to match each of data processing systems 30 and 32.

In other words, as shown in FIG. 3, a first compile-on-demand server 20 can be implemented with an AOT compiler 20*c* having a CPU of an A type and an AOT compiler 20*d* having a CPU of a B type which correspond to two kinds of CPUs in a single compile-on-demand server. A second compile-on-demand server 22 includes an AOT compiler 22*c* having a CPU of a C type which corresponds to a kind of CPU.

The database 20*b* or 22*b* which is used for storing the native component produced by the AOT compiler 20*c*, 20*d* or 22*c* is a device which stores position information and the compiled native component for the pre-processed JAVA class file. The database is used to avoid a repetition of a compile work and to directly transmit the pre-processed result, in the case that a request for re-transmission of the same class file is received from the data processing systems 30 or 32.

The compile information table 20a or 22a is used in a compile-on-demand server, to receive a request for a compile-on-demand service from a variety of kinds of the data processing systems 30 or 32, and process the received compile-on-demand service. The table contains a name of an AOT compiler and information for setting an execution condition of the AOT compiler for each identification code of the native library 30b or 32b mounted on the data processing system 30 or 32.

The operation process of the JAVA compile-on-demand service system for accelerating a processing speed of a JAVA program in a mobile data processing system according to the present invention having the above-described configuration, will be described with reference to FIG. 4.

Figure 4:
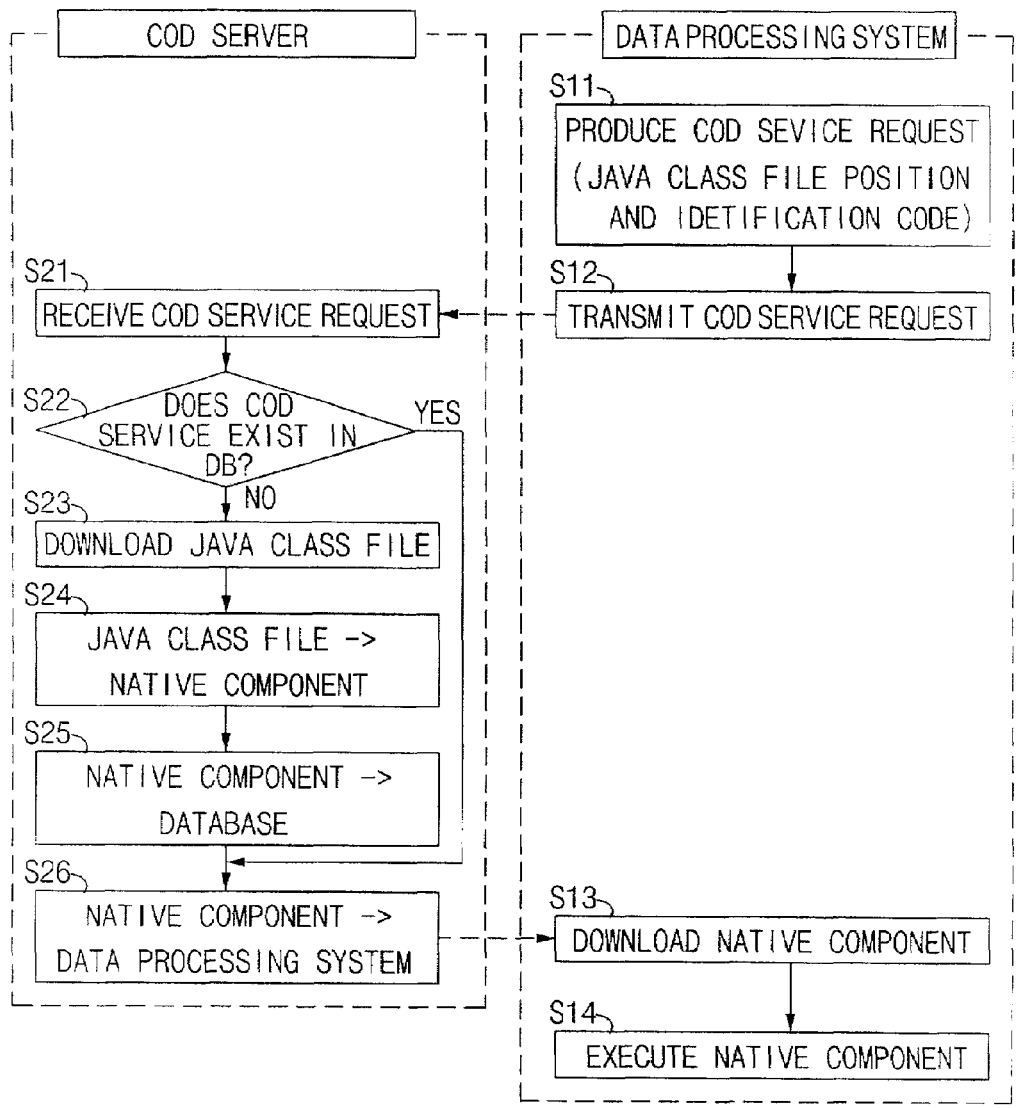
FIG. 4 is a flowchart view for explaining a JAVA program language compile-on-demand service method for accelerating a processing speed of JAVA program in a data processing system such as an information processing terminal called a personal digital assistant (PDA) according to the present invention.

A shown in FIG. 4, in order to provide a compile-on-demand service with respect to a JAVA program according to the present invention, a compile-on-demand service network should be constructed so that JAVA program providing servers 10 and 12 for providing various JAVA programs via the Internet, data processing systems 30 and 32 mounted with the native libraries 30b and 32b and the native components 30a and 32a, and compile-on-demand servers 20 and 22 are connected with one another, which can be easily constructed through the general Internet network.

In the present invention, a compile-on-demand service with respect to a JAVA program requested from a plurality of various kinds of data processing systems via the constructed network as described above, will be provided through the following processes.

1. First Step

The compile-on-demand server 20 or 22 receives a service request message with respect to a JAVA program compile from the data processing system 30 or 32 (S11, S12, S21)

The service request message includes a position of the JAVA program providing server 10 or 12 where a desired JAVA program exists, a position of the JAVA program in the corresponding JAVA program providing server 10 or 12, and identification codes for identifying the kinds of the data processing systems 30 or 32 having requested for the compile service.

The JAVA program providing server 10 or 12 can be configured by an Internet server which provides only a particular JAVA program. However, the JAVA program providing server 10 or 12 includes most Internet servers which can be accessed through the Internet to provide a JAVA program.

2. Second Step

The compile-on-demand server 20 or 22 analyzes the service request message received from the data processing system 30 or 32, and ascertains whether the native component which has been compiled so that the requested JAVA class file can be executed in the data processing system 30 or 32 having requested from the service has already been stored in the database 20b or 22b (S22).

In the case that the compiled native component has been stored in the database 20b or 22b via the ascertained result, a corresponding native component is read out from the database 20b or 22b, to then be transmitted to the data processing system 30 or 32 and executed therein. Then, the following third through fifth operations will be omitted.

3. Third Step

In the case that there is no compiled native component which matches the kind of the data processing system having requested a service, the data processing system accesses the JAVA program providing server 10 or 12 designated by the received service request message, and downloads the designated JAVA class file (S23).

4. Fourth Step

The compile-on-demand server 20 or 22 selects an AOT compiler which can produce a native component for the data processing system 30 or 32 from the compile information table 20a or 22a, by using the identification code of the data processing system 30 or 32 included in the service request message, and drives a corresponding AOT compiler according to an execution condition set in the compile information table 20a or 22a, to thereby compile the downloaded JAVA class file into the native component (S24).

5. Fifth Step

The compile-on-demand server 20 or 22 stores the native component produced by the AOT compiler 20c, 20d or 22c in the database 20a or 22a, together with the JAVA class file position information included in the service request message received in the first step (S25), and transmits the native component to the corresponding data processing system 30 or 32 (S26).

6. Sixth Step

The data processing system 30 or 32 receives the native component from the compile-on-demand server 20 or 22 via the native component loader 30a or 32a (S13), relocates the received native component in a memory and executes the program (S14).

As described above, the present invention having the configuration as described above provides an effect of compiling a JAVA program to be executed in a data processing system into a pattern which can be executed more speedily on a compile-on-demand server connected via the network without having a particular JIT compiler in the data processing system, in order to execute any JAVA program on the Internet in a data processing system using a processor having a limited capacity of a memory and a relatively low performance, to thereby accelerate a processing speed of the JAVA program.

INDUSTRIAL APPLICABILITY

As described above, the present invention can be easily and smoothly used in an on-line and an off-line game and an electronic commerce service all of which are made up of JAVA programs in a portable information processing device which uses wireless Internet communications such as a mobile telephone terminal, which contributes to development of a wireless Internet related service.

As described above, the present invention has been described with respect to a particularly preferred embodiment. However, the present invention is not limited to the above embodiment, and it is possible for one who has an ordinary skill in the art to make various modifications and variations, without departing off the spirit of the present invention.

What is claimed is:

1. A compile-on-demand service system for accelerating execution speed of an interpreter-based program on at least one of a plurality of data processing system types, the compile-on-demand service system comprising:

at least one compiler transforming an interpreter-based executable file requiring intermediate execution on an interpreter into at least one binary file corresponding to a selected data processing system type, said binary file being executable in at least one remotely disposed data processing system;

at least one compile-on-demand server executing said compiler and transmits said binary files via the Internet to said data processing system, responsive to remote initiation thereby; and, at least one program providing source providing at least one interpreter-based executable file requiring intermediate execution on the interpreter.

2. The compile-on-demand service system of claim 1, wherein said binary file is a file which is executable in said data processing system without said interpreter.

3. The compile-on-demand service system of claim 1, wherein said binary file contains at least one binary code which is executable in a CPU.

4. A data processing system for accelerating execution speed of an interpreter-based program on at least one of a plurality of data processing system types, wherein the data processing system downloads at least one binary file via the internet, and said binary file is compiled by a remote compile service system which responsive to remote initiation by remotely disposed data processing system transforms an interpreter-based executable file requiring intermediate execution on an interpreter into at least one binary file corresponding to a selected data processing system type, said binary file being executable without said interpreter, said binary file being executed in said data processing system; at least one interpreter-based executable file requiring intermediate execution on the interpreter being provided by at least one program providing source.

5. The data processing system of claim 4, wherein said binary file contains at least one binary code which is executable on a CPU.

6. A compile-on-demand service method for accelerating execution speed of an interpreter-based program on at least one of a plurality of data processing system types, the method comprising the steps of:

(a) receiving at a compile-on-demand server from a remote data processing system via the internet, a request for transforming at least one interpreter-based executable file requiring intermediate execution by an interpreter into at least one binary file corresponding to a selected data processing system type, said binary file being executable in at least one data processing system;

(b) providing at least one interpreter-based executable file requiring intermediate execution on the interpreter, and transforming said at least one interpreter-based executable file into at least one binary file which is executable in at least one data processing system responsive to said request from said data processing system; and (c) downloading said at least one binary file from said compile-on-demand server to at least one data processing system via the internet.

7. The compile-on-demand service method of claim 6, wherein said binary file is a file which is executable in at least one data processing system without said interpreter.

8. The compile-on-demand service method of claim 6, wherein said binary file contains at least one binary code which is executable on at least one CPU.

* * * * *